Sept. 3, 1929.  O. L. OLNEY  1,727,248
DIRIGIBLE HEADLIGHT
Filed Oct. 10, 1927   2 Sheets-Sheet 1
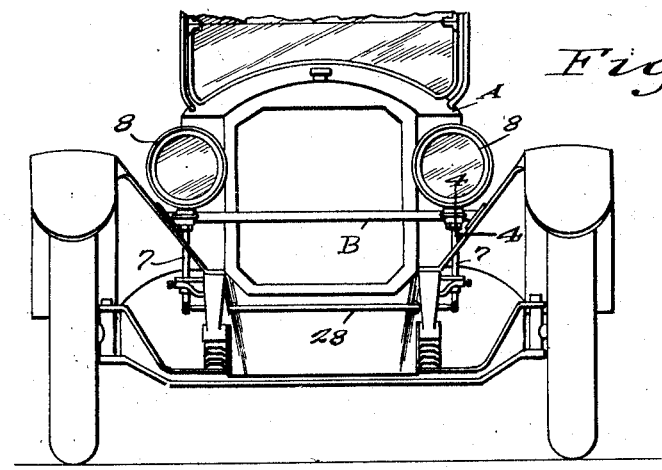
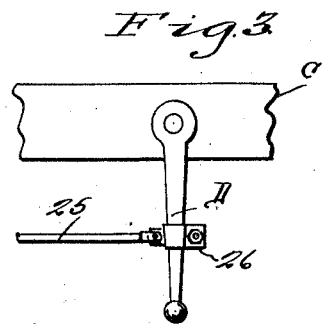
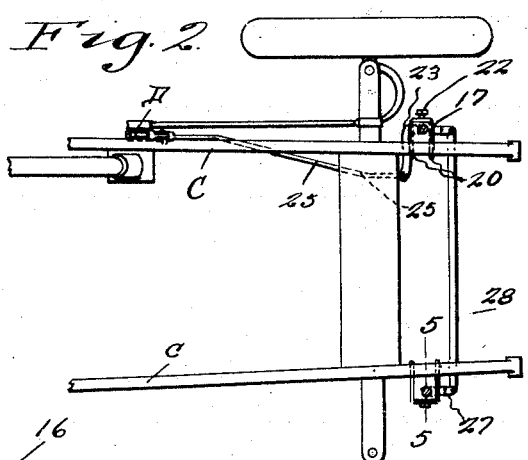
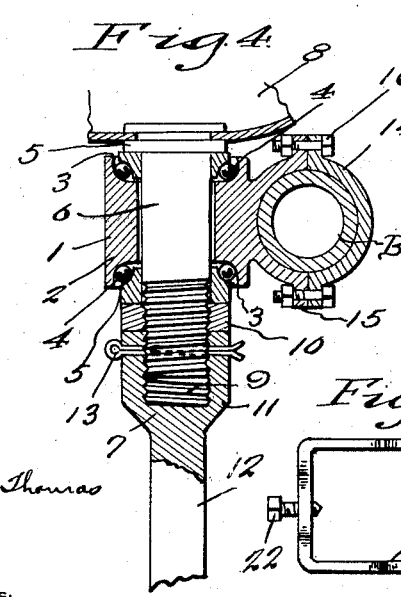
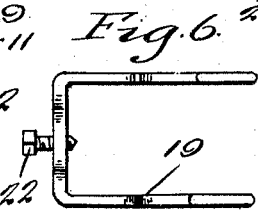
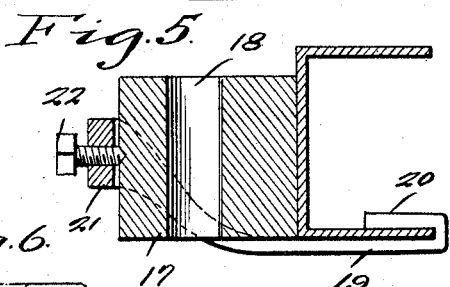
O. L. Olney, INVENTOR Sept. 3, 1929.   O. L. OLNEY   1,727,248
DIRIGIBLE HEADLIGHT
Filed Oct. 10, 1927   2 Sheets-Sheet 2

O. L. Olney INVENTOR
BY Victor J. Evans
ATTORNEY

WITNESS:

Patented Sept. 3, 1929.

1,727,243

UNITED STATES PATENT OFFICE.

OSCAR L. OLNEY, OF WILMINGTON, NEW YORK, ASSIGNOR, BY DIRECT AND MESNE ASSIGNMENTS, TO DIRIGIBLE HEADLIGHT COMPANY, INC., OF LAKE PLACID, NEW YORK, A CORPORATION OF NEW YORK.

DIRIGIBLE HEADLIGHT.

Application filed October 10, 1927. Serial No. 225,252.

This invention relates to dirigible lamps for motor vehicles, and its general object is to provide a controlling device for vehicle headlamps, that is capable of being connected with the steering mechanism of the vehicle, so that the lamps will be directed in accordance with the course of travel of the vehicle.

A further object of the invention is to provide a dirigible headlamp device for motor vehicles, that includes novel bearings for the headlamp posts, and which enable the device to be applied to most any type and make of vehicle, with little or no change to the latter.

Another object of the invention is to provide a headlamp controlling device that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a fragmentary front elevation of a motor vehicle showing the application of the device which forms the subject matter of the present invention.

Figure 2 is a top plan view of a fragmentary portion of the vehicle with the lamp posts in section.

Figure 3 is a fragmentary side elevation of the vehicle frame and showing the manner of connecting the device to the steering arm of the vehicle.

Figure 4 is a sectional view taken approximately on line 4—4 of Figure 1.

Figure 5 is a sectional view taken approximately on line 5—5 of Figure 2.

Figure 6 is a detail view of one of the bearing clamps which forms a part of the present invention.

Figure 7:
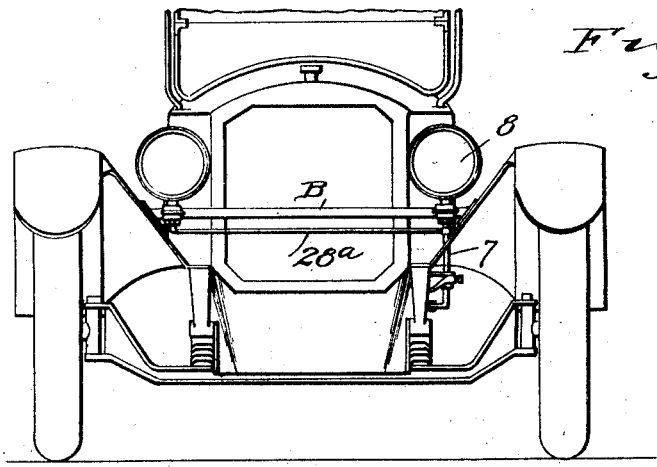
Figure 7 is a view similar to Figure 1 but showing a slightly different arrangement of the invention.

Referring to the drawings in detail, the letter A indicates a motor vehicle, B the fender brace thereof, C the frame or chassis and D the steering arm.

The device which forms the subject matter of the present invention includes a pair of bearing brackets secured to the fender brace adjacent its ends as best shown in Figure 1 of the drawings, and each of these bearing brackets include a body 1 formed with a bore 2 which has its ends extending into substantially arcuate-shaped recesses 3 formed in the top and bottom of the body as best shown in Figure 4 of the drawings. These recesses 3 provide ball races for receiving balls 4 which are held therein through the instrumentality of recessed collars 5 which have their recesses arranged for cooperation with the recesses 3 for the purpose as set forth. The collars 5 are mounted upon stub portions 6 of the lamp posts 7 and these stub portions are passed through the bores of the bodies 1 and have their upper ends secured to the lamps 8 and their lower ends are threaded as at 9 to receive a nut 10 whereby the collars 5 can be adjusted with respect to the balls as will be readily apparent. The threaded portion of the stub portions of the posts are received in a threaded coupling 11 formed with the post proper 12, and a cotter pin 13 is passed through the coupling and stub portion for holding these parts in positive operative position.

Formed with each of the bodies 1 and extending rearwardly therefrom is one half of a clamp 14, which is provided with apertured ears 15 whereby the other half of the clamp which is also provided with apertured ears may be secured thereto through the instrumentality of bolt and nut connections 16 for fixing the bearing brackets to the fender brace B as set forth.

Secured to the frame or chassis C and extending from the outer side thereof in alignment with the bearing brackets, are bearing blocks 17 which are provided with bores 18 to receive the lower portion of the post proper as suggested in Figure 1 of the drawings. These bearing blocks 17 are detachably fixed to the frame through the medium of a substantially U-shaped clamp 19 which include arms terminating in hooks 20 receiving one of the flanges of the frame as shown in Figure 5, and the arms are bent upwardly upon themselves so as to dispose the bight portion 21 of the clamps midway the top and bottom of the blocks. Formed in the bight portion is a threaded opening adapted to receive a stud bolt 22 having a pointed inner end for engagement with its block as shown in Figure 5.

A bell crank lever 23 is secured to the underside of one of the posts, and intermediate the ends of one of the portions of the bell crank lever, which portion extends forwardly of the post as shown in Figure 2 of the drawings. The remaining portion of the bell crank lever extends inwardly and terminates in a slightly rearward curved end 24 which pivotally receives one of the ends of a bent link 25 while the opposite end of said link terminates in a fork and is secured to a clamp 26 which is detachably secured to the steering arm D. Extending forwardly from the other post 7 is an arm 27 which is secured to the underside of said post and pivotally receives one end of a cross link 28 and the opposite end of this cross link 28 is pivotally secured to the forward portion of the bell crank lever 23 as best shown in Figure 2 of the drawings.

From the above description and disclosure of the drawings, it will be obvious that I have provided a controlling means for the headlights of a motor vehicle, which is actuated by the steering mechanism of the vehicle through the medium of the steering arm D and by this construction, the headlamps 8 will be directed in accordance with the course in which the vehicle is steered, and the device can be associated with most any type and make of vehicle with very little changes to the construction of the latter as it will be noted from Figure 1 that in the vehicle as shown therein that openings are made for the cross link to travel in, and openings are arranged in the fender aprons to accommodate the lamp post, therefore the device can be applied to the vehicle in an easy and expeditious manner with very little effort.

Figure 8:
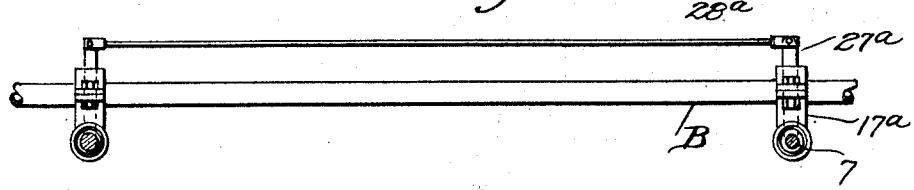
Figure 8 is a fragmentary plan view partly in section.

In Figures 7 and 8, there is illustrated a slightly different form of the invention. In these figures, the cross link 28$^a$ which is attached to arms 27$^a$, extends across the front of the radiator of the automobile below the fender brace bar B. These arms 27 pass beneath the brace bar and are secured to the posts 7, so that the latter will be simultaneously rotated.

Figure 9:
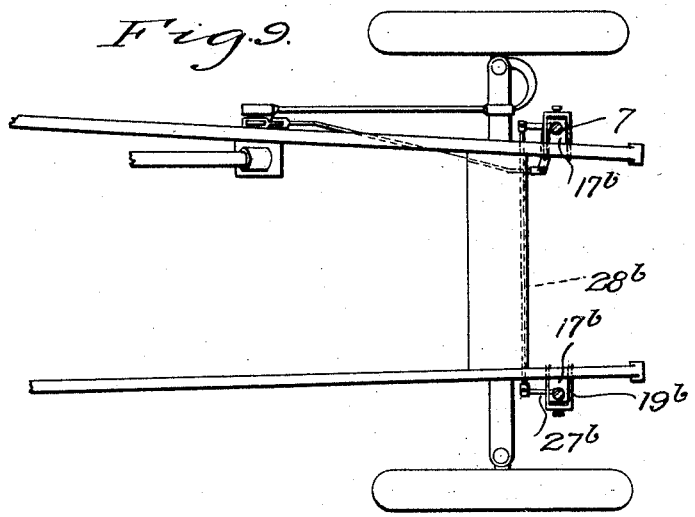
Figure 9 is a view showing a fragmentary portion of the front end of the chassis with the invention applied, the arrangement of the cross link being slightly different from that shown in the preceding forms of the invention.

In Figure 9, the cross link 28$^b$ extends at the rear of the front apron of the automobile and is connected by arms 27$^b$ to the posts 7. These posts are mounted in bearing blocks 17$^b$ which are secured to the frame of the automobile by clamps 19$^b$.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

In a dirigible headlight device of the character described, bearing brackets each including a body, a lamp post mounted for rotation in each body, a lamp secured to each post, a bearing block for each post, a substantially U-shape clamp receiving the bearing block and including arms curved for a portion of their length and terminating in hooks receiving the frame of the chassis of the vehicle, a vertically disposed bight portion formed with said arms, a stud bolt threadedly mounted in the bight portion and engageable with the block for securing the latter with respect to the chassis.

In testimony whereof I affix my signature.

OSCAR L. OLNEY.